Feb. 14, 1950     A. M. DONOFRIO     2,497,212
METHOD OF MANUFACTURING CAPSULES
Filed Oct. 31, 1945     4 Sheets-Sheet 2
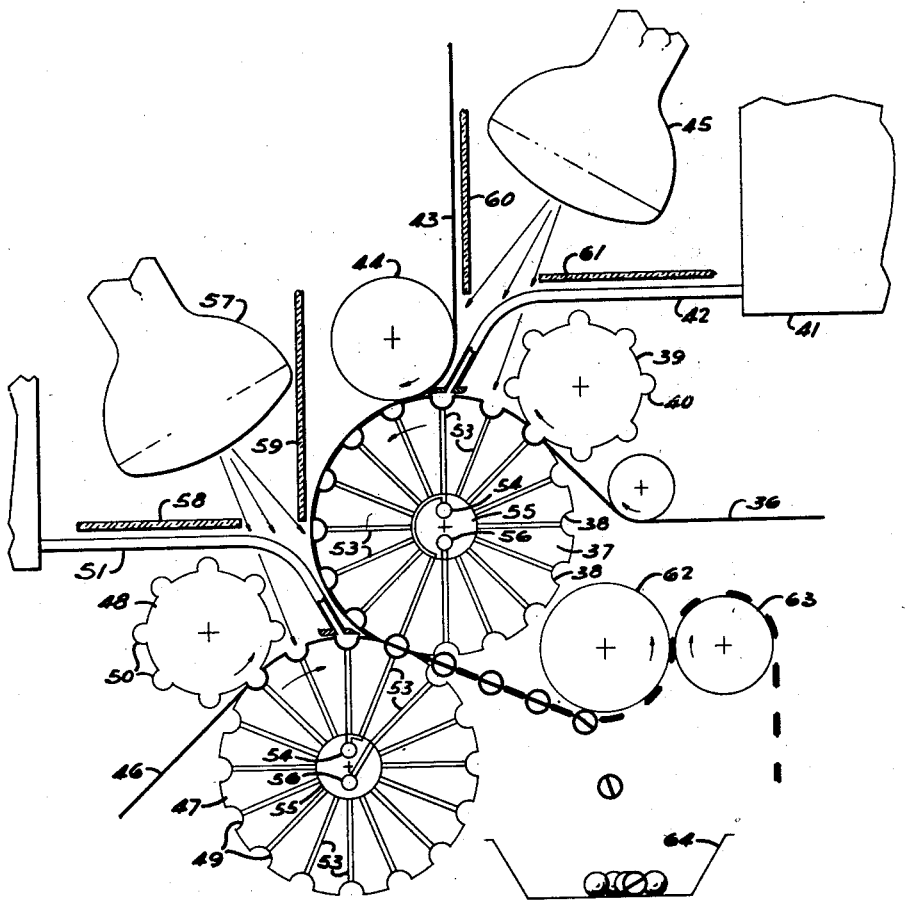
Fig. VII
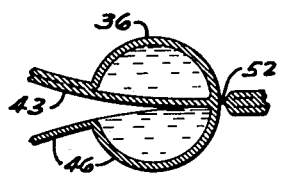
Fig. VIII
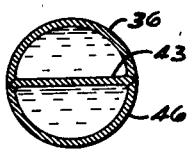
Fig. IX
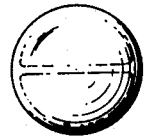
Fig. X
INVENTOR.
Alfonso M. Donofrio
BY
Marshall & Marshall
ATTORNEYS Feb. 14, 1950 A. M. DONOFRIO 2,497,212
METHOD OF MANUFACTURING CAPSULES
Filed Oct. 31, 1945 4 Sheets-Sheet 3
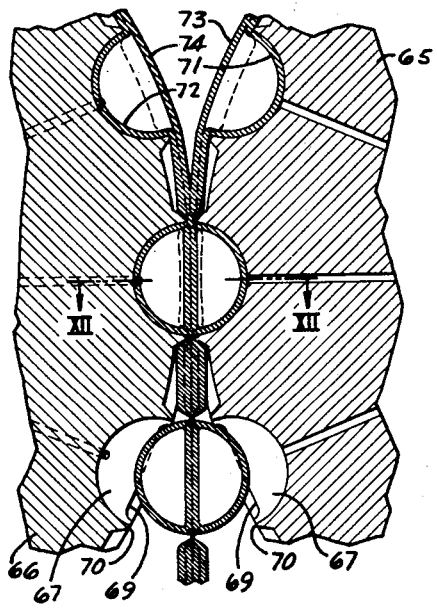
Fig. XI
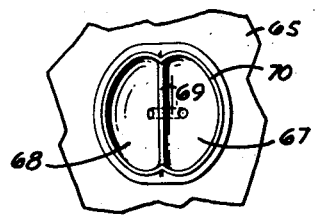
Fig. XIII
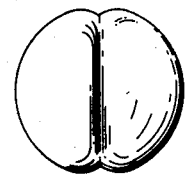
Fig. XVI
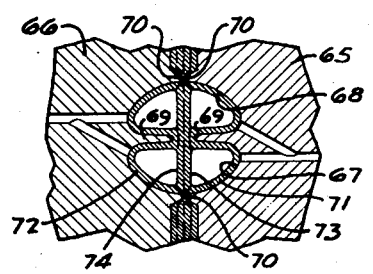
Fig. XII
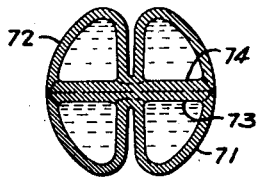
Fig. XIV
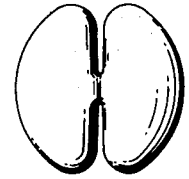
Fig. XV
INVENTOR.
Alfonso M. Donofrio
BY
Marshall & Marshall
ATTORNEYS

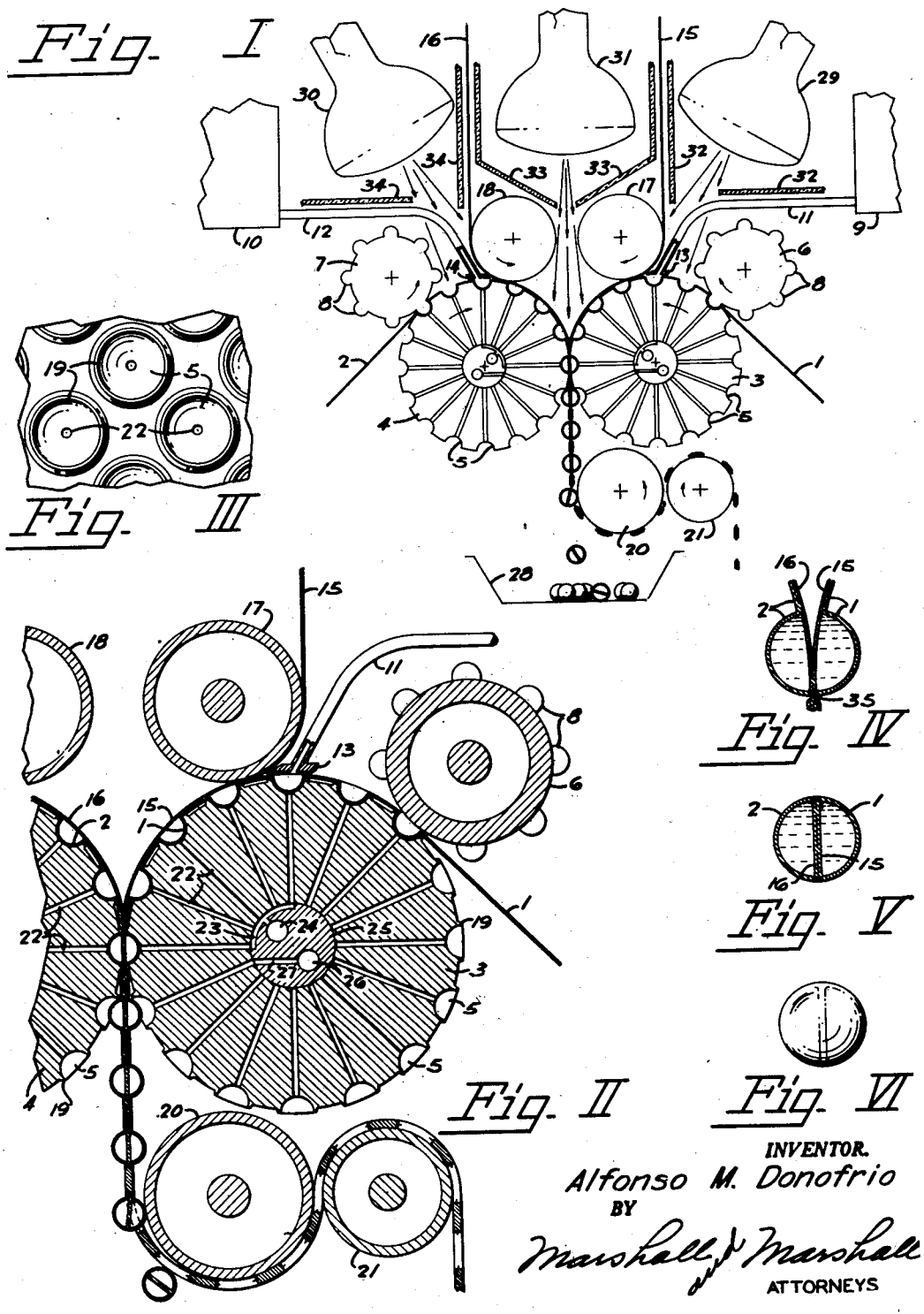

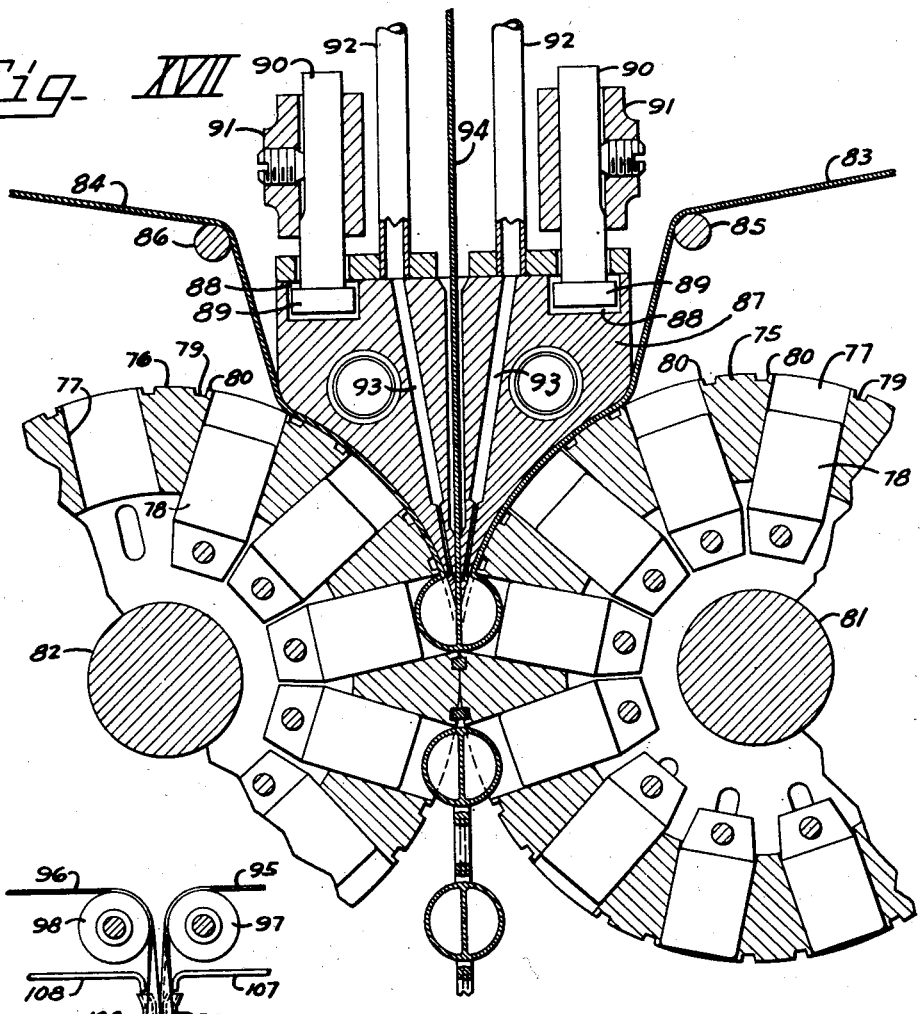

Patented Feb. 14, 1950

2,497,212

UNITED STATES PATENT OFFICE 2,497,212

METHOD OF MANUFACTURING CAPSULES

Alfonso M. Donofrio, Toledo, Ohio

Application October 31, 1945, Serial No. 625,752

11 Claims. (Cl. 18—56)

This invention relates to a method of manufacturing multicompartment capsules.

Many products are encapsulated for convenience in distribution and use. Among these are medicinal compounds, such as vitamins, which are commonly encased in gelatin capsules. Capsules are also used when small, accurately determined quantities of material are to be used in compounding other products, such as, for example, small capsules of food coloring which are sold with oleomargarine, the contents of which when mixed with the oleomargarine give it a color resembling that of butter.

The present methods of manufacturing capsules do not permit the production of other than single compartment capsules. This limitation makes it necessary that physicians prescribe the taking of two or more capsules at each dose when the prescription requires the use of materials which are unstable in the presence of each other. Since the present machines cannot incorporate the whole prescription in a single capsule, the responsibility is put on the user not to omit taking one or more of the capsules nor to mix them with the result of taking several of one kind and none of another.

The principal object of this invention is to provide a method for manufacturing multicompartment capsules in which various incompatible portions of a prescription may be contained.

Another object of this invention is to provide a method of manufacturing multicompartment capsules in which the walls of the various compartments may have different solubility or penetration characteristics whereby the contents of the various compartments may be released at different times.

Another object of the invention is to provide a method of manufacturing multicompartment capsules that permits the various compartments to be filled with liquid, paste or solid material.

Another object of the invention is to provide a method of manufacturing capsules which permits relatively large pellets to be included within the capsule without destruction of the pellets.

These and other objects and advantages are apparent from the following description in which reference is made to the accompanying drawings.

In the drawings:

Figure I is a schematic illustration of one method of manufacturing a multicompartment capsule.

Figure II is a sectional view showing in detail the formation of the capsule from plastic sheet material.

Figure III is a fragmentary view of a portion of the periphery of the main sealing rolls.

Figure IV is a sectional view showing a pair of capsule sections in the process of being sealed together.

Figure V is a sectional view of a completed capsule.

Figure VI is a plan view of a completed capsule as manufactured by the method illustrated in Figures I and II.

Figure VII is a schematic illustration of a second method of manufacturing a multicompartment capsule.

Figure VIII is a sectional view of the capsule in the process of manufacturing.

Figure IX is a section of a completed capsule.

Figure X is an elevation of a completed capsule.

Figure XI is a fragmentary cross section of sealing rolls for manufacturing another form of multicompartment capsule.

Figure XII is a fragmentary section taken substantially along the line XII—XII of Figure XI.

Figure XIII is a fragmentary view looking into one of the cavities of the sealing roll illustrated in Figure XI.

Figure XIV is a sectional view of a multicompartment capsule as formed with the sealing rolls illustrated in Figure XI.

Figure XV is an elevation of the completed capsule.

Figure XVI is a plan view of the completed capsule.

Figure XVII schematically illustrates another method of forming a multicompartment capsule.

Figure XVIII shows still another method of forming multicompartment capsules.

Figure XIX is a horizontal section taken substantially along the line XIX—XIX of Figure XVIII.

Figure XX is an elevation, partly in section, taken along the line XX—XX of Figure XVIII.

These specific drawings and the accompanying description are intended merely to illustrate the invention and not to impose limitations upon the claims.

The invention contemplates forming the improved capsule by depositing the material to be encapsulated in a pocket in a sheet of plastic material and forming a capsule from several pockets assembled so that each pocket constitutes a compartment in the finished capsule. In the preferred method three strips of plastic capsule material are used, two of the strips having pockets containing material to be encapsulated while the remaining strip forms a partition between the compartments when the pockets are sealed to the partition strip in completing the capsule. In this method the partition may be either a single sheet of material or a laminated sheet depending upon whether or not the pockets are closed before they are placed in juxtaposed position and sealed together.

The manufacture of the capsule may be carried out as substantially a single step, or it may be divided into a series of steps.

The invention further contemplates the use of plastic sheeting of different characteristics for forming the outer walls of various compartments of the multicompartment capsule. By using dissimilar materials for the outer walls of different compartments of capsules intended to be taken internally it is possible to release the contents of one compartment in one portion of the alimentary canal while the contents of the remaining compartment or compartments are carried along and released in other portions of the canal. The improved capsule may also be used when two materials are to be administered successively by predetermining the characteristics of the compartment walls so that one wall dissolves in a relatively short time while the walls of other compartments dissolve relatively slowly. The difference in the characteristics of the walls may consist either in differences in the composition of the plastic material or in differences in shape or thickness.

The use of a multicompartment capsule makes it feasible to enclose two or more incompatible substances in a single capsule, since each substance may be confined within a separate compartment. It is thus possible to provide a single capsule containing a number of vitamin compounds some of which are unstable in the presence of others. The improved capsule may be used for other compounds, such as photographic developers which are now marketed in separate containers and are combined immediately prior to use. By the use of a multicompartment capsule the preparation for use of such materials reduces merely to dissolving the contents of one capsule in a given quantity of water. This insures that exact proportions are maintained and that none of the ingredients is omitted.

The method of manufacture of the improved capsule in its preferred form is such that the capsule may be filled with a liquid, a paste or a solid either in powdered form or in granules, and since the filling of each compartment is independent of the others it is easy to provide a capsule having one compartment filled with liquid and another with a solid. No limit is placed on the size of the granules which may be used, except that they should not be materially greater than half the thickness of the finished capsule, that is, they must be small enough to be contained within a compartment of the capsule. Since the character of the granules is not otherwise limited the term may also be used to include pellets or small capsules. The use of small capsules in this manner also permits the sequence of the release of the capsule contents to be controlled because the small enclosed capsule is not subjected to a disintegrating agent until the enclosing capsule has disintegrated.

The improved capsules may be formed in any of the common shapes, and in their preferred form are generally ellipsoidal. The term "ellipsoidal" is herein used in its general meaning to denote a solid bounded by a curved surface. It includes, as special cases, ellipsoids of revolution and spheres, which are symmetrical about an axis. It also includes pear-shaped solids and in a limiting case, as one side approaches a plane, it includes elliptical domes or hemispheres. Teardrops are included as a variety of pear-shaped ellipsoids.

The partitions between the compartments in the multicompartment capsule may be either plane or curved. If the compartments are symmetrical and filled with equal quantities of material the partition walls between the compartments are planar. If the quantities of fill are unequal the partition between the compartments may tend to distend into the compartment having the lesser fill so as to maintain a substantially symmetrical exterior for the capsule.

Those capsules that are intended to be taken internally are usually made of gelatin, either alone or combined with suitable modifying agents. Capsules for other use, such as marketing chemicals for specific applications, may be made of other plastic materials selected according to the material to be encapsulated and its conditions of use.

The first method for manufacturing the improved multicompartment capsule is illustrated in Figures I to VI. In carrying out this method, a pair of plastic sheets 1 and 2 are trained over and passed between a pair of sealing rolls 3 and 4. Each of the sealing rolls is provided with a plurality of hemispherical depressions 5 arranged in its periphery. The sealing rolls 3 and 4 are driven in unison and synchronized such that the hemispherical depressions 5 in one roll register with those in the other. As the sheets 1 and 2 are trained onto the rolls 3 and 4 a pair of indenting rolls 6 and 7 each provided with a plurality of hemispherical projections 8 force portions of the plastic sheets 1 and 2 into the hemispherical depressions 5 to form pockets or dimples therein. As the sheets progress over the top of the sealing rolls 3 and 4 material to be encapsulated is driven by pumps contained within tanks 9 and 10 through delivery tubes 11 and 12 whose ends are formed into shoe-like portions 13 and 14 closely overlying the path of the pockets formed in the films 1 and 2. There are a plurality of such feeding tubes, one for each circumferential row of hemispherical depressions 5 in each of the sealing rolls 3 and 4. The pumps are synchronized with the sealing rolls so as to deliver measured quantities of material as the pockets in the film register with the shoe-like portions 13 and 14. As soon as the pockets are filled and are carried beyond the shoe-like portions they are closed by plastic cover sheets 15 and 16, which passing beneath idler rolls 17 and 18 are pressed into firm contact with the sheets 1 and 2 to confine the material within the pockets formed therein.

The cover sheets 15 and 16 combining with the pocketed sheets 1 and 2 form a pair of multiply sheets which are carried between the sealing rolls 3 and 4 so that lands 19 surrounding each of the hemispherical depressions 5 pinch the several layers of plastic material together and thereby seal the pockets to form completed capsules. The capsules are not pinched completely clear of a web composed of the two multiply sheets but are carried downwardly free from the hemispherical depressions 5 and are snapped free from the web as it is drawn around a snapping roller 20 and over an idler roll 21.

A vacuum or reduced pressure is maintained beneath each of the pockets formed in the plastic sheets when they are positioned in the depressions 5 by withdrawing air from the depressions 5 through radial passages 22 during that portion of the revolution of the rolls during which the passages 22 register with a suction port 23 communicating with a vacuum line 24 extending through an axle 25 on which the sealing roll rotates. After the capsule is completely formed compressed air supplied through passages 26 and 27 in the axle 25 is fed through the radial passages 32 of the roll to free the capsules from the hemispherical depressions 5. As the capsules are snapped free from the web they are collected in a trough 28 and conveyed to suitable packaging equipment.

When gelatin is used as the plastic material for forming the envelope for the capsules its temperature must be maintained within that range in which it is sufficiently pliable to be formed into pockets and to be sealed by the pressure exerted by the lands 19 of the sealing rolls. When employing the method illustrated in Figure I the temperature of the sheets 1 and 2 is just high enough that the pockets may be formed by the hemispherical projections 8. During the filling operation the surfaces of the sheets 1 and 2 and cover sheets 15 and 16 are heated by infra-red heat energy from bulbs 29 and 30. The temperatures of the surfaces of the sheets 1, 2, 15 and 16 are raised sufficiently by the infra-red heating so that they fuse when they are pressed together between the sealing rolls and the cooperating idling rolls 17 and 18. An additional source of infra-red heat 31 is arranged to heat the top surface of the cover sheets 15 and 16 immediately prior to the final capsule sealing operation carried out between the sealing rolls 3 and 4. The quantity of heat applied from these heat sources is regulated according to the speed of operation of the machine to provide sufficient heating of the plastic material to insure a perfect bond when the surfaces are pressed together. Heat shields 32, 33 and 34 are provided for each of the heat sources 29, 30 and 31 to confine the heat to the selected portions of the plastic films and to prevent heating of the rollers.

Figures IV, V and VI illustrate successive steps in the formation of a capsule as it passes between the sealing rolls 3 and 4. In Figure IV the sheets have been pressed together at the bottom of the capsule leaving only a thin fin 35 connected to the capsule. As the capsule progresses past the line of centers of the rolls 3 and 4 the sealing progresses around the sides of the capsule and finally is completed at the top. As the combined sheets—the web—containing the completed capsules feeds downwardly from the sealing rolls 3 and 4 the capsules are dislodged from the sheet with the fins 35 remaining with the web leaving a smooth exterior for the capsule as is illustrated in Figures V and VI.

A second method of producing a multicompartment capsule and the resulting capsule are illustrated in Figures VII, VIII, IX and X. In this example a sheet 36 of plastic material is passed over a sealing roller 37, similar to the sealing roll 3 of the previous example. This sealing roll has depressions 38, similar to the depressions 5 in the sealing roll 3. An indenting roll 39 having hemispherical projections 40 forces portions of the plastic sheet 36 into the depressions 38 to form pockets for receiving the material to be encapsulated. As the pockets are carried over the top of the sealing roll 37, measured quantities of filling material are discharged from a tank 41 through a tube 42 and into the pockets formed in the plastic sheet 36. As soon as the pockets are filled they are covered by a cover sheet 43, which passing under an idler roll 44 is firmly pressed against the sheet 36 to close the pockets. The adjacent surfaces of the sheets 36 and 43 are heated by an infra-red heater 45 so that a secure bond between the surfaces is assured. A second plastic sheet 46 passes between a lower sealing roll 47 and a second indenting roll 48. The lower sealing roll 47 has depressions 49 adapted to receive pockets 47 formed in the sheet 46 by projections 50 protruding from the second indenting roll 48. The lower sealing roll 47 is disposed below and to one side of the first sealing roll 37 so that the pockets formed in the sheet 46 may be filled by material pumped through a tube 51 while the pockets are carried horizontally by the rotation of the lower sealing roll 47. Subsequent to filling the pockets in the sheet 46 the previously filled pockets in the sheet 36 which were closed by the cover sheet 43 are brought into registry and the registering pockets are sealed to the cover sheet 43 as the surrounding portions of the three sheets are pinched together leaving the capsule supported by a thin fin 52 in a web composed of the three sheets 36, 43 and 46.

As in the previous example, the pocketed sheet is held securely in place on the sealing roll by vacuum drawn in the depressions 38 and 49 through radial passages 53, during that portion of a revolution during which they communicate with suction ports 54 in axles 55 carrying the sealing rolls. Compressed air is blown through ducts 56 in the axles 55 and through the radial passages 53 to loosen the completed capsules from the cavities or depressions.

The formation of the perfect bond between the outer surface of the cover sheet 43 and the lower pocketed sheet 46 is insured by infra-red heating from a heat source 57 which is applied to the films shortly before they are brought into contact with each other. Other portions of the sheets are shielded from the infra-red heating by heat guards 58 and 59. Similar guards 60 and 61 are provided for the heat source 45.

The completed capsules may be stripped from the web of the plastic sheets by any of the well known stripping arrangements. If desired, a snapping roll 62 against which the sheets are drawn by a driving drum 63 serves to effectively dislodge the capsules so that they may drop into a receiving trough 64.

The capsule produced by this method, from its exterior, is indistinguishable from that produced by the first method. The difference between the capsules is merely that the one produced by the second method has a partition formed of a single sheet of plastic material separating the compartments while the capsule formed according to the first method has a partition formed from two sheets of material—the cover sheets 15 and 16.

In either of these methods those plastic sheets in which the pockets are formed may have different characteristics such that the order of release of the contents of the various compartments may be selected and controlled. Since the compartments are separated from each other at all times incompatible materials may be encapsulated without difficulty. Since the pockets are relatively open during the filling operation it is possible to fill them with pastes or solid material as readily as with liquids.

In both of these examples the sealing rolls have been shown as designed for the production of spherical capsules. Any of the other forms which may be described as generally ellipsoidal may be produced just as easily by suitable modification of the cavities in the sealing rolls and the projections of the indenting rolls.

Another form of capsule may be produced by either of the foregoing methods by suitable modification of the indenting and sealing rolls and of the filling tubes. The modifications in the sealing rolls and the capsule produced by these rolls is illustrated in Figures XI to XVI inclusive. This form of capsule is a multicompartment capsule having more than two compartments. It is produced by employing sealing rolls 65 and 66 having connected cavities 67 and 68. The outline of the pair of cavities 67 and 68 may be generally circular with the cavities separated by a dividing wall 69. As seen in detail in Figure XII, the top of the dividing wall 69 is beneath the general level of lands 70 surrounding the pair of cavities 67 and 68. Plastic sheets 71 and 72 corresponding to the sheets 1 and 2 are formed with pockets extending to the cavities 67 and 68. These pockets after being filled are covered by cover sheets 73 and 74 and then passed between the sealing rolls 65 and 66 to be formed into completed capsules. The height of the dividing wall 69 is great enough so that the plastic sheets 71 or 72 overlying the wall will seal to the cover sheets 73 or 74 to prevent leakage from one compartment to the other. When the pockets pass between the sealing rolls the several sheets are sealed together along the tops of the dividing walls 69 as well as around the periphery where the sheets are pinched by the lands 70 to completely seal the capsule.

The resulting capsule, which in the form illustrated has four compartments, cannot be described as being generally ellipsoidal in shape because the term "ellipsoidal" does not include a body having a re-entrant surface or a waist portion joining two larger portions.

This capsule may be made by either of the preceding methods so that the partition between the compartments may be either a single sheet of material or a double sheet. In either method the compartments are separated by a partition.

The capsule illustrated is symmetrical in that it has four compartments of substantially equal size and shape. The two halves of this capsule may be kept separate to form two-compartment capsules. It is possible also to produce a three-compartment capsule by merely omitting the dividing walls 69 from the cavities in one of the forming and sealing rolls. The dividing walls of the other roll must then extend somewhat higher so that a firm bond is established between the plastic sheet overlying the dividing wall and the cover sheet at the time the cover sheet is applied. The sealing rolls cannot effect this bond because the partition is unsupported during the final sealing operation.

Another method of forming a multicompartment capsule consists in bringing three sheets of plastic material into contact along converging lines, and forming pockets in the outermost sheets, filling the pockets with material to be encapsulated and sealing the pockets in substantially one operation. The device illustrated in U. S. Patent No. 2,296,294, which is designed to produce ordinary single compartment capsules, may be modified as illustrated in Figure XVII to form multicompartment capsules. This machine includes a pair of sealing rolls 75 and 76 each having a plurality of radial drilled holes 77 in which pistons 78 are freely slidable. The periphery of each of the holes 77 is surrounded by a relief 79 leaving a land 80. The sealing rolls 75 and 76 are mounted for rotation on axles 81 and 82 and are synchronized so that the holes 77 and the lands 80 register with each other as the rolls are rotated. A pair of sheets 83 and 84 of plastic material are trained over guides 85 and 86, onto the peripheries of the sealing rolls 75 and 76 and into the space between the rolls.

A filler head 87 whose lower surface conforms to the curvature of the sealing rolls 75 and 76 rides on the plastic sheets 83 and 84 as they are drawn downwardly by the rotation of the rolls. The floating movement of the filler head 87 is limited to the clearance between sockets 88 fashioned in its upper surface and heads 89 of bolts 90 rigidly mounted in a portion 91 of the framework of the machine.

Material to be encapsulated is delivered through tubes 92 and passages 93 to the points of the filler head 87 positioned between the sheets on the rolls. Pumps delivering the material through the passages are synchronized with the rotation of the sealing rolls 75 and 76 so that measured quantities of material are delivered as the holes 77 pass the discharge ends of the passages 93. The material to be encapsulated thus distends the plastic sheets 83 and 84 to form pockets.

As modified, the filler head 87 is divided so that a third sheet 94 of plastic material may be threaded down between the halves of the filler head to form a partition between the pockets in the sheets 83 and 84. As the sealing rolls 75 and 76 rotate the lands 80 pinch the three sheets of plastic material together to seal the pockets to the partition sheet 94 and thus produce a capsule having separate compartments. The filled capsules may be separated from the three-ply web by any of the well known methods or by employing the mechanism illustrated in Figures I, II and VII. The floating pistons 78 serve to dislodge any capsules which may have broken free from the web and lodged in the holes 77.

Still another method of forming multicompartment capsules results from modification of the capsule forming device illustrated in U. S. Patent No. 2,339,286. The modification of this device, with enough of the old structure to show its operation, is illustrated in Figures XVIII, XIX and XX. The original device illustrated in the patent forms a single compartment capsule by forming a tube of plastic sheet material around a hollow mandrel, closing the end of the tube, depositing material to be encapsulated in the pocket formed by the closed end of the tube and pinching off a portion of the tube including the closed end to form a sealed capsule. The pinching-off operation also closes the end of the plastic tube in preparation for receiving the next portion of the filling material. As it is modified, this structure operates on a pair of strips 95 and 96 formed of plastic material. The strips are trained over guide pulleys 97 and 98 and into the space between the flat sides of two spaced mandrels 99 and 100. The mandrels are hollow, are D-shaped in cross section and are positioned with their flat sides facing each other and spaced apart a distance somewhat greater than the combined thickness of the plastic strips 95 and 96. The strips 95 and 96 are drawn down between a pair of tube forming rolls 101 and 102 in such a manner that the edges of the strip are brought around the curved sides of the mandrel 99 and 100 and are sealed together by pressure exerted between the rims of the rolls 101 and 102. The mandrels 99 and 100 extend a short distance beyond the rolls 101 and 102 and into the space between the upper ends of a pair of mold blocks 103 and 104. The mold blocks 103 and 104 each have recesses 105 proportioned so that when the mold is closed the recesses 105 form a generally spherical cavity adapted to shape the finished capsule. Other recesses 106 cooperate to form a cylindrical open-top cavity having a hemispherical bottom. The mandrels 99 and 100 extend into the cylindrical cavity produced by the recesses 106. The rolls 101 and 102 are given an intermittent rotary movement which is synchronized with the opening and closing of the molds 103 and 104 so that as the molds open after forming a capsule the tubes of plastic sheet material are advanced into position for the next capsule forming operation.

The material to be encapsulated, fed through a pair of tubes 107 and 108 into the upper ends of the hollow mandrels 99 and 100, flows through the mandrels and is deposited in the pockets formed at the lower ends of the plastic tubes through the orifices 109 drilled in the otherwise closed bottom ends of the hollow mandrels.

In each of the methods described at least two sheets of plastic material are employed in forming the multicompartment capsule. The process of manufacture keeps the compartments separated at all times so that incompatible materials, i. e., those undergoing decomposition in each other's presence or those incapable of forming a solution, may be contained within a single capsule. The use of two separate sheets permits the manufacture of a capsule in which the release of the materials contained in the several compartments may be effected successively. The order of the succession of the releases and the time interval between the releases is controlled by the selection of material and thickness for the capsule walls in relation to the conditions under which the release is to occur.

The details in the manufacture of multicompartment capsules from sheets of plastic material may be varied to suit particular requirements as they may arise without departing from the general method of manufacture as illustrated generally in the various methods described.

Having described the invention, I claim:

1. A method of manufacturing a multicompartment capsule for successively releasing the contents of different compartments, that comprises depositing material to be encapsulated into pockets formed in two separate sheets of plastic material each of which has characteristics substantially different from that of the other, closing at least one of said pockets with a cover sheet of gelatin, assembling said pockets in registry on opposite sides of the last mentioned sheet and sealing the gelatin sheets around the common margins of said pockets.

2. A method of manufacturing a capsule that comprises filling a dimple in a sheet of plastic material with a material to be encapsulated while the dimpled sheet is held in a generally horizontal position, closing the dimple with a cover sheet, and completing the capsule by sealing another filled dimple on to the opposite side of the cover sheet in registry with the first filled dimple.

3. A method of manufacturing a capsule that comprises filling a dimple in a sheet of plastic material with a material to be encapsulated while the dimpled sheet is held in a generally horizontal position, closing the dimple with a flat cover sheet, placing the cover sheet against the cover sheet of a similar dimpled sheet with the dimples in registry, and joining the dimples to form a capsule.

4. A method of manufacturing a capsule that comprises depositing substance to be encapsulated in each of a pair of pockets preformed each in a separate sheet of gelatin, placing the filled pockets in registry on opposite sides of at least one flat sheet of gelatin and sealing all of the gelatin sheets together around the common margin of the pockets.

5. A method of manufacturing a capsule that comprises depositing a pre-determined quantity of substance to be encapsulated in each of a pair of pockets of predetermined size preformed each in a separate sheet of gelatin, closing at least one of the filled pockets with a second substantially flat, sheet of gelatin, sealing the first and second sheets of gelatin around the margin of the pocket, placing the other filled pocket in juxtaposition to the closed pocket and on the opposite side of said second sheet of gelatin from the first pocket and sealing all of the sheets of gelatin around the common margin of the two pockets.

6. A method of manufacturing a capsule that comprises pocketing a sheet of plastic capsule enclosing material, filling the pocket with a substance to be encapsulated, pocketing and filling a second sheet of plastic capsule enclosing material, inserting at least one sheet of such material between the open faces of the pockets and sealing the first two mentioned sheets of material to the last mentioned sheets with the substances contained thereby on diametrically opposite sides of the last mentioned sheet.

7. A method of manufacturing a medicinal capsule that comprises forming a pocket in a sheet of capsule gelatin, filling the pocket with a substance to be encapsulated, forming a pocket in a second sheet of capsule gelatin, filling the pocket in the second sheet with a substance to be encapsulated, covering at least one of the filled pockets with a third sheet of capsule gelatin, placing the filled pockets on diametrically opposed sides of the third sheet and sealing the three sheets together around the margins of the enclosed substances.

8. A method of manufacturing a multi-compartment medicinal capsule that comprises forming a substantially hemispherical pocket in a sheet of edible gelatin, filling the pocket with a substance to be encapsulated, closing the filled pocket with a second sheet of edible gelatin, forming a substantially hemispherical pocket in a third sheet of edible gelatin, filling the second pocket with a substance to be encapsulated, placing the open side of the second pocket on the side of the second sheet opposite from the first filled pocket and sealing the gelatin sheets around the margins of the two pockets.

9. A method of manufacturing a multi-dose medicinal capsule that comprises forming a pocket in a sheet of edible gelatin, filling the pocket with a quantity of substance to be administered, covering the filled pocket with a flat sheet of edible gelatin, forming a second, similar pocket in another sheet of edible gelatin, filling the second pocket with another substance to be administered, placing the second filled pocket against the flat sheet of gelatin, in registry with and on the opposite side from the first filled pocket and sealing the gelatin sheets around the common margin of the pockets.

10. A method of forming multicompartment capsules that comprises convexly pocketing at least two separate sheets of encapsulating material, depositing at least one selected content substance into each of the pockets, closing at least one of the pocketed sheets with a separate sheet of material, assembling the filled pockets in registry on opposite sides of the closing sheets with their convex sides turned outwardly and sealing all of the material around the common margins of the pockets.

11. A method of forming multicompartment capsules that comprises forming generally hemispherical pockets in each of two separate sheets of encapsulating material, depositing a quantity of a selected substance in each of said pockets, assembling the filled pockets in registry and on opposite sides of at least one partition sheet of encapsulating material, sealing the sheets of encapsulating material around the common margins of the pockets and severing the completed capsules from the sheets.

ALFONSO M. DONOFRIO.

REFERENCES CITED

The following references are of record in the file of this patent:

UNITED STATES PATENTS

| Number | Name | Date |
|---|---|---|
| 462,990 | Oppenheimer | Nov. 10, 1891 |
| 1,077,835 | Kelly | Nov. 4, 1913 |
| 1,356,544 | Miller | Oct. 26, 1920 |
| 2,099,402 | Keller | Nov. 16, 1937 |
| 2,219,578 | Pittenger | Oct. 29, 1940 |
| 2,333,433 | Mabbs | Nov. 2, 1943 |
| 2,339,114 | Scherer | Jan. 11, 1944 |
| 2,340,037 | Zipper | Jan. 25, 1944 |
| 2,379,817 | Mabbs | July 3, 1945 |